A. Quantin.
Sheet 1
2 Sheets.
Bottling App's.
No. 3,272.
Reissued Jan. 19, 1869.
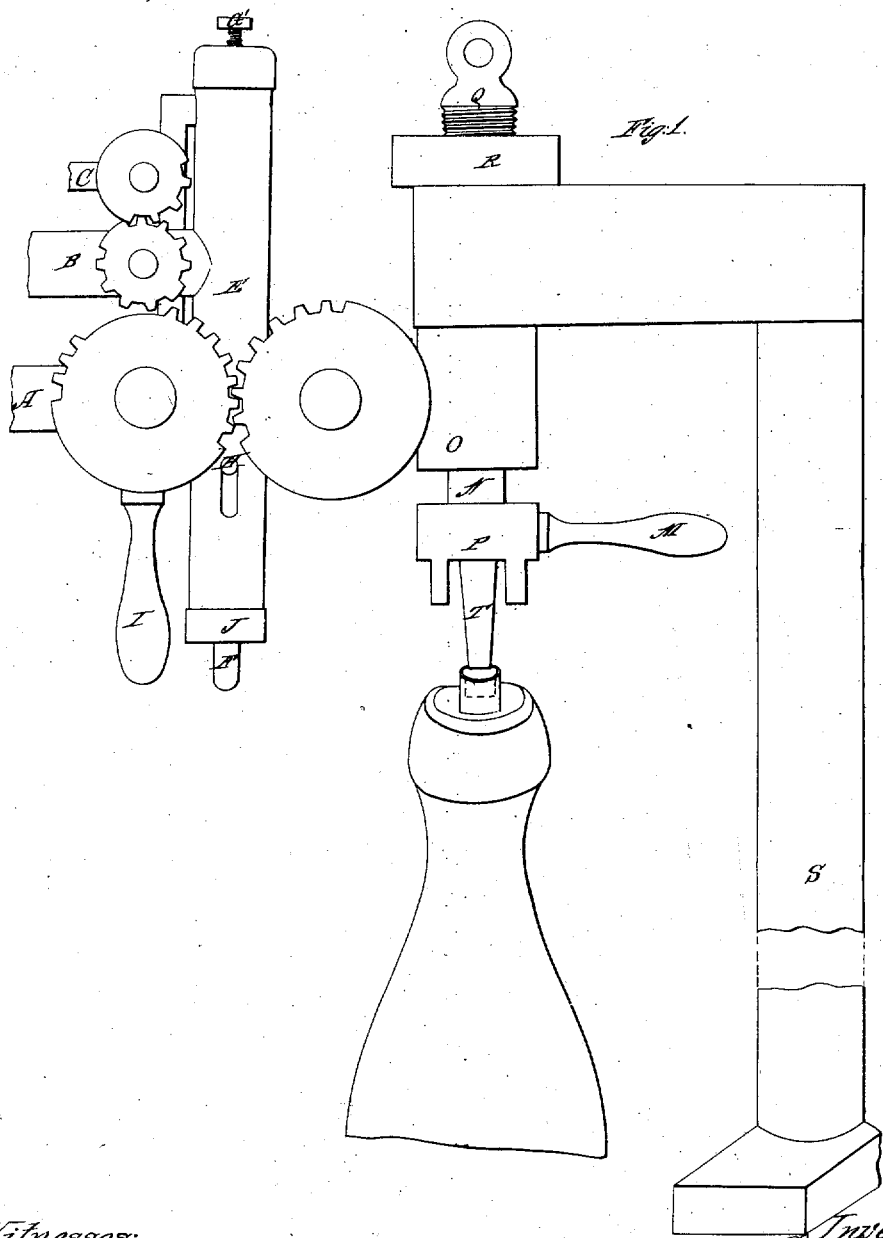
Witnesses:
J. M. Combs
A. Dellore
Inventor:
Phil Schmitt
assignee of Alphonse Quantin dec.
Kenbrown Combs & Co
Atty A. Quantin.
Sheet 2, 2 Sheets
Bottling App's.
No. 3,272. Reissued Jan. 19, 1869.
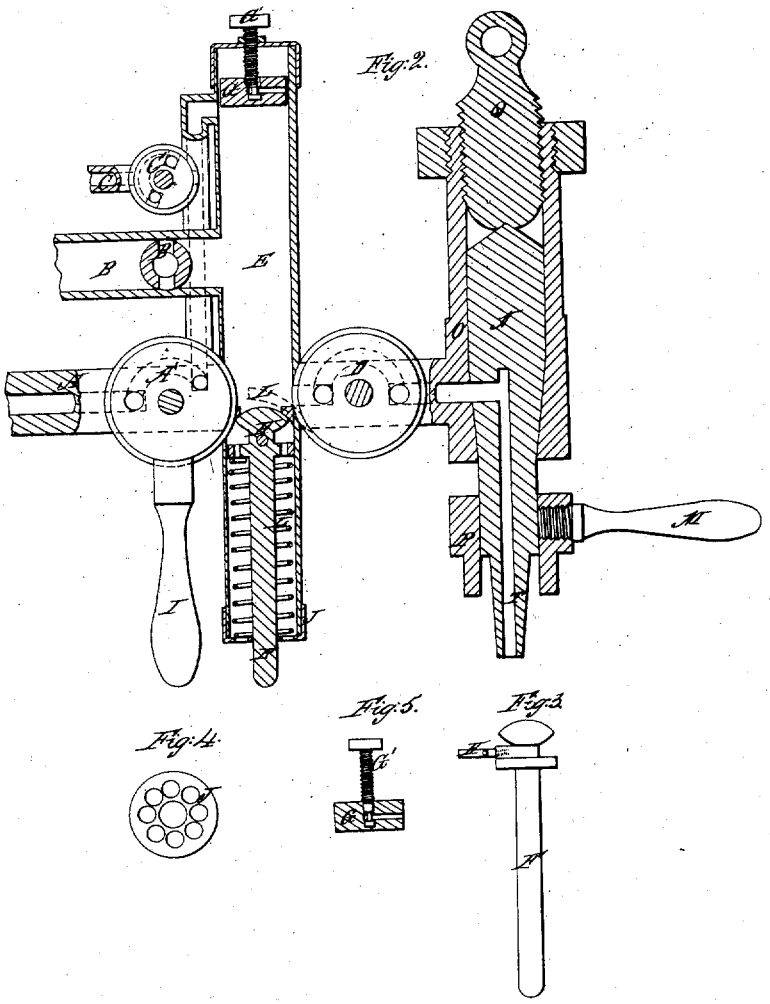
Witnesses:
J. M. Coombs.
A. de Clerc
Inventor:
Paul Schmitt
Assignee of
Alphonse Quantin d.c.
Per Brown Coombs & Co.
Atty.

United States Patent Office.

PAUL SCHMITT, OF NEW YORK, N. Y., ASSIGNEE OF JANE QUANTIN AND H. A. PINTARD, ADMINISTRATORS OF ALPHONSE QUANTIN, DECEASED.

*Letters Patent No.* 14,368, *dated March* 4, 1856; *reissue No.* 3,175, *dated October* 27, 1868; *reissue No.* 3,272, *dated January* 19, 1869.

IMPROVED METHOD OF BOTTLING FLUIDS UNDER GASEOUS PRESSURE.

The Schedule referred to in these Letters Patent and making part of the same.

*To all whom it may concern:*

Be it known that the following is a full, clear, and exact description of an Improved Apparatus for Bottling Mineral-Water or other Fermented Beverage or Fluid under Gaseous Pressure, the invention of ALPHONSE QUANTIN, deceased, formerly of the city and county of Philadelphia, in the State of Pennsylvania, reference being had to the accompanying drawing, forming part of this specification, and in which—

Figure 1 represents an outside view or elevation, partly in perspective, of an apparatus constructed in accordance with said invention;

Figure 2, a vertical section of the same;

Figure 3, a side or longitudinal view of a surplus or waste-escape valve detached;

Figure 4, a view, from beneath, of the lower end of the mixing or measuring-chamber of the apparatus; and Figure 5, a vertical section of a piston, with its operating-screw furnished to the measuring-chamber of the apparatus.

This invention embraces a new method of drawing off aerated liquids, such as mineral or soda-water, into bottles or vessels by the admission of any desired quantity of sirup and aerated liquid through the same filling-head or nozzle, thus effecting the sweetening or siruping of the aerated liquid while the bottle or vessel is being filled or engaged in the machine, thereby accomplishing by a continuous operation what before required separate ones, as, for instance, first supplying, by funnels, or dippers, or bottles, the sirup to the vessel to be charged or filled, and afterward filling the latter with the aerated fluid from or by a separate fountain. This improvement is effected by the combined action of valves or cocks, operating in unison, to introduce simultaneously, or at the one filling, into the bottle or vessel, both the sirup and mineral-water.

The invention may be further described as embracing a sirup-measuring chamber, in combination with the filling-head of a bottling-machine; also, means or a method of operating, whereby the sirup is expelled from the measuring-chamber, by force applied in rear of it, separate or distinct from mere gravity as produced by a head of sirup.

Also, the invention consists in an air-tube or vent, to permit the escape of air from the sirup-measuring chamber, opened and closed by the operation of the water-drawing valve or cock.

Furthermore, the invention includes or consists in a combination, in the one machine or apparatus, of discharging-nozzle, for drawing off the aerated water with a sirup-measuring chamber, valve controlling the egress of sirup from the measuring-chamber, with a conduit for the passage of the aerated water; likewise, geared connection of cocks or valves, to admit the aerated water, with the device or means by which the sirup is admitted or expelled.

Referring to the accompanying drawing, which depicts one form of apparatus, and construction of certain details, in illustration of the above-named improvements—

A is a tube, and

A′, a cock, applied thereto, for supplying the measuring or mixing-chamber E with soda or mineral-water, the same being discharged, by passage A″, into the upper part of the chamber E.

The sirup is supplied to said chamber, preferably at a point below the ingress of mineral-water thereto, by a tube, B, which is controlled by a cock, B′.

An air-tube or vent, C, which may be controlled by a cock, C′, is also furnished to the upper part of the chamber E, or passage in communication with the same, to establish the necessary air-flow for admission of the sirup into and secure its timely discharge from the chamber E.

D is a cock for controlling the discharge of the mineral-water and sirup from the chamber E. The several cocks are represented as geared together by cog-segments or wheels, for operation in unison, and should operate relatively to each other, substantially as follows; that is, when the cocks B′ and C′ are open, then the cocks A′ and D are closed, and *vice versa*.

I is a handle, attached to the cock A′, for operating the above-named cocks or valves.

F is a valve, arranged in the lower portion of the chamber E, to free said chamber from water which it contains, before admitting the sirup.

This valve is opened by an arm, L, which is attached to or connected with the cock D, and is shut by the action of a spring, L′, after the passage of the water through the lower portion J of the tube or chamber E, said lower portion being perforated, for the purpose of allowing the waste waster to escape.

H is a knee, attached to the valve F, and passing through an opening made in the lower part of the chamber E, said knee serving to open the valve F by the arm L, that is attached to the cock D, by which it is put in motion, and bends at the return of the arm, to prevent the action of the valve F.

G is a piston, furnished to the chamber E, and which may be operated by a screw, G′, or otherwise, said piston being so applied and operating within the chamber E as to regulate the quantity of sirup admitted and expelled, by increasing or diminishing the capacity of the chamber or space open to the admission of sirup each charge.

T is the filling or discharge-nozzle, which may be connected with a cock, N, that has a passage or passages in it, establishing communication, through its seat or case O and cock D, between the chamber E and nozzle T.

The case O, which forms the seat of the cock N, and which establishes the connection between the mixing and filling-portions of the apparatus, may serve, in connection with a standard, S, to support or carry the mechanism of the apparatus, said case O being held to the arm or standard, S, which secures the machine to a table, by a nut, R.

A screw, Q, may be applied to effect the adjustment and retention in its place of the cock N.

Said cock is turned, to effect its opening and closing, by a lever, M, which is here shown as also serving to turn a cylinder, P, that turns the top of the stopper of the bottle in gear or connected with the filling-nozzle; that is, where bottles having such suitable or peculiarly-constructed stoppers, as hereinafter referred to, are used.

To operate an apparatus constructed as described, the nozzle T is inserted into the mouth of the vessel or bottle, or opening in the stopper of the latter, when, the chamber E containing the requisite measure of sirup, the cock A is opened, by swinging laterally in the one direction the lever I, which permits the mineral-water to enter the tube or chamber E, and there to mix with or force along with or before it the sirup, through the cock D, which is also opened, and from thence both sirup and water pass through the cock N or nozzle T to the vessel or bottle under operation of being filled. After this, the lever M is turned, to close the cock N, and, in case of using such device, to give a half turn to the cylinder P, to close the upper portion of the stopper, which completes the operation, supposing bottles having stoppers to be used, similar, for instance, to the form described in Letters Patent issued, July 25, 1854, to the within-named ALPHONSE QUANTIN.

The one bottle or vessel having thus been filled, to repeat the operation, the lever I is reversed, or worked laterally in an opposite direction, so as to shut the cocks A′ and D, and open the sirup-cock B′ and air-cock C′, which causes the sirup, fed from any suitable source through the tube B, to enter the measuring-chamber E, regulated, as specified, by the piston G, that acts upon the top of the sirup or fluid, and determines the quantity to be used each charge. This done, upon turning the lever M, to open the cock N, and shifting the lever I, to close the cocks B′ and C′, and open the cocks A′ and D′, the bottle or vessel is again filled.

Thus, it will be seen that the sirup and mineral-water, the former in any given or desired quantity, are supplied to the bottle or vessel by one continuous operation, and that force is applied to the top of the column or charge of the sirup other than that of mere gravity to expel the sirup or inject it through the filling-head into the bottle or vessel along with the aerated water, the same effectually clearing the measuring-chamber each operation of sirup. The importance of the air-vent C to secure the passage of the sirup will be readily understood.

Among the general advantages incidental to an apparatus of this description, may be mentioned, the bottling or dispensing of the aerated water with, if required, sirup, to flavor the same, by one operation, and which is altogether distinct from mixing the two liquids in the metallic fountain that supplies the water, that is objectionable, on account of galvanic action, and otherwise. Another general advantage is the saving of time, labor, liability to breakage, exposure to insects or dust, and waste or spilling attendant upon the ordinary or previous method of first putting the sirup, by a separate vessel, into the bottle, and afterward removing the latter, to be filled with aerated water from the fountain.

The mixing-portion of this apparatus, which secures the greatest regularity, with any desired variation in quantity of sirup to a charge, may be adapted to other filling-devices; and the apparatus generally, though particularly suitable for mineral-water, is equally applicable to bottling or dispensing fermented liquids or other fluids under gaseous pressure.

What is here claimed, and desired to be secured by Letters Patent, is—

1. The above-described device, for filling bottles or other vessels with aerated water and sirup, consisting of conduits or passages A and B, a sirup-measuring chamber, and a discharging-nozzle or their known mechanical equivalents, so arranged that the water and sirup may be discharged from said nozzle common to both, substantially as shown and described.

2. The combination and arrangement in one draught-apparatus of the sirup-measuring chamber and a cock or valve for drawing aerated water, substantially as shown and described.

3. The arrangement of the sirup-conduit and the water-conduit, as a consequence of which the sirup is expelled from its conduit, and such sirup is mingled with the water at some distance from their common outlet, substantially as shown and described.

4. The combination, substantially as described, of a valve or cock for drawing the water, and a device for receiving and dispensing the sirup, as a consequence of which the reception and dispensing of the sirup are accomplished by the manipulation of the valve or cock for drawing the water.

5. The construction and arrangement of the vent-opening and closing device and the water-drawing valve or cock, as a consequence of which they are both operated simultaneously by the movement of water-drawing valve, substantially as shown and described.

PAUL SCHMITT.

Witnesses:

FREDERICK TEAL, JR.,

CHAS. D. WATKINS.